United States Patent [19]

Fullerton

[11] 4,378,187
[45] Mar. 29, 1983

[54] QUICK-ACTING NUT ASSEMBLY

[76] Inventor: Robert L. Fullerton, P.O. Box 4119, Incline Village, Nev. 89450

[21] Appl. No.: 78,118

[22] Filed: Sep. 24, 1979

[51] Int. Cl.³ .............................................. F16B 39/36
[52] U.S. Cl. .................................. 411/267; 411/237; 411/303
[58] Field of Search .................. 151/19 R, 7; 85/33; 411/267, 266, 265, 237, 238, 222, 303, 302, 301

[56] References Cited

U.S. PATENT DOCUMENTS

| | | | |
|---|---|---|---|
| 2,021,051 | 11/1935 | Desbrueres | 151/19 R |
| 2,896,496 | 7/1959 | Jansen | 151/19 R X |
| 3,352,341 | 11/1967 | Schertz | 151/19 R |

FOREIGN PATENT DOCUMENTS 590430  7/1947  United Kingdom .......... 151/19 R

*Primary Examiner*—Ramon S. Britts
*Attorney, Agent, or Firm*—David A. Boone; Jon Stark

[57] ABSTRACT

A multifaceted nut casing has a wedge fit threaded jam nut for compressing into engagement on the threads of a bolt as the nut is tightened into a locked position.

10 Claims, 11 Drawing Figures

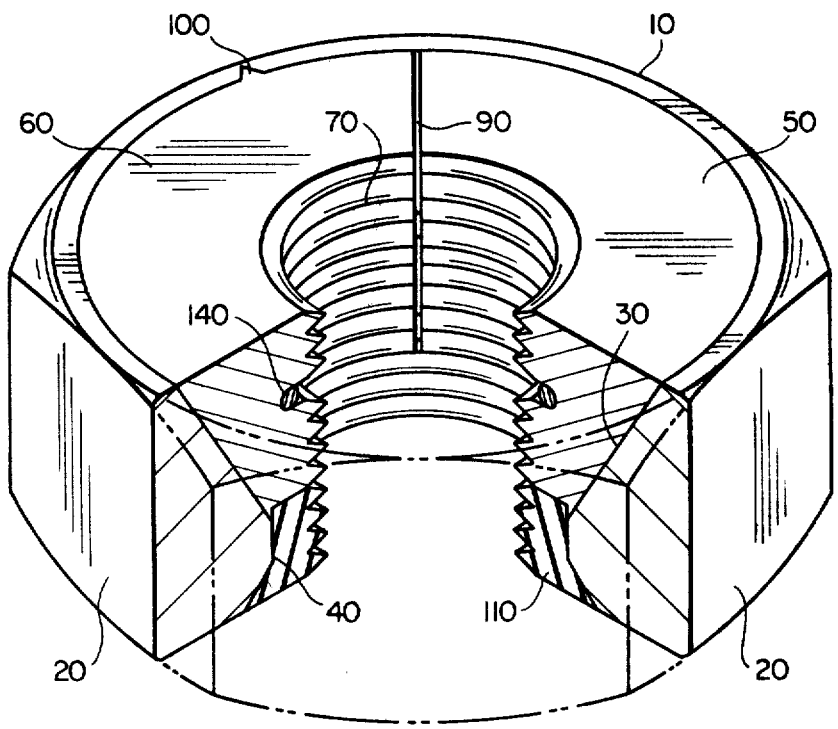
FIG_1
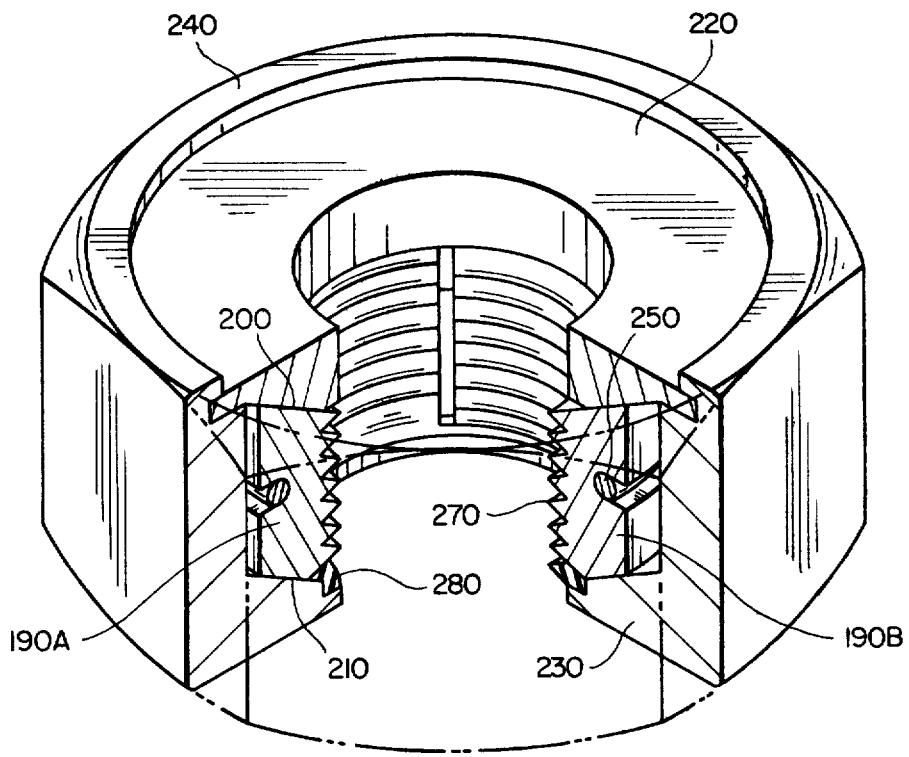
FIG_10

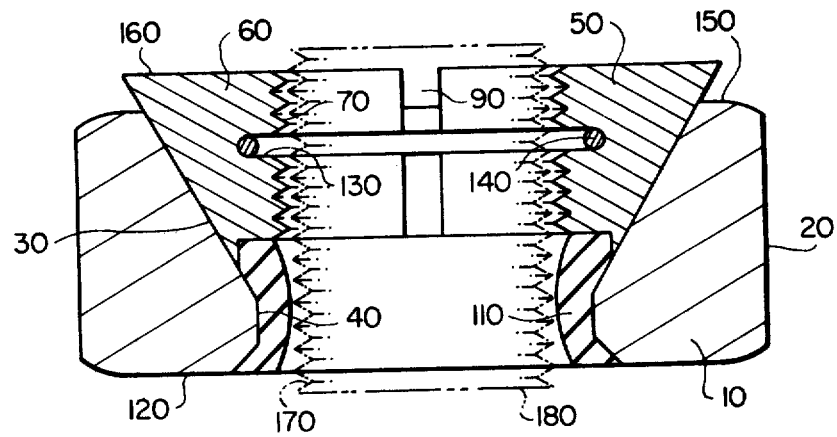
FIG_2
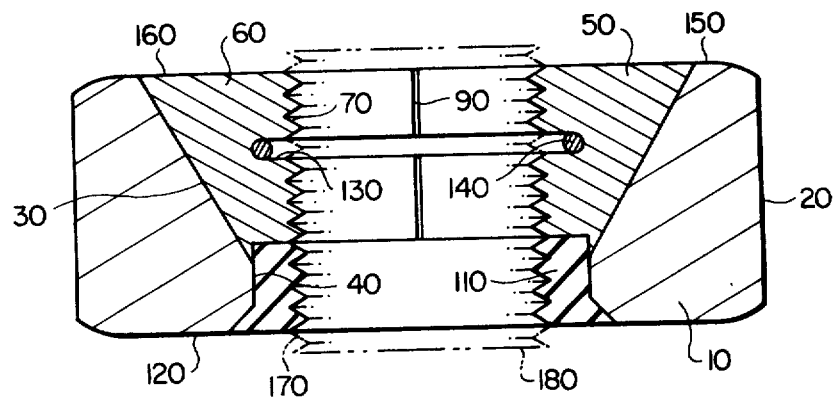
FIG_3
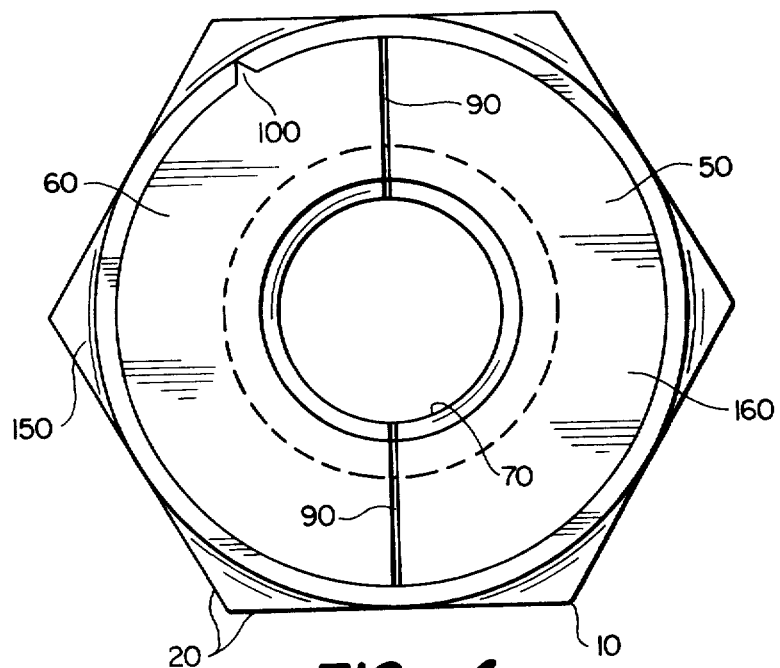
FIG_4

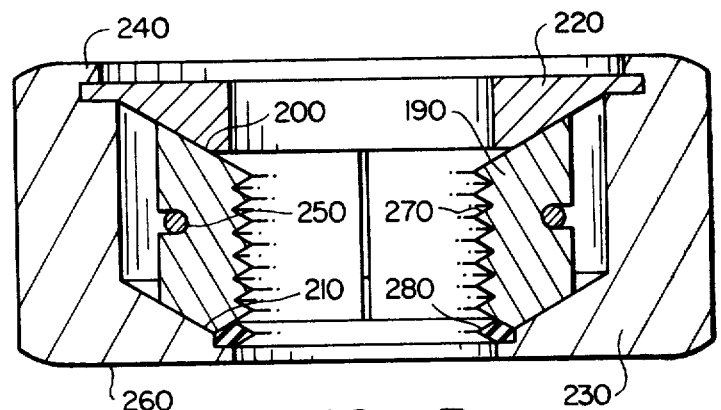
FIG_5
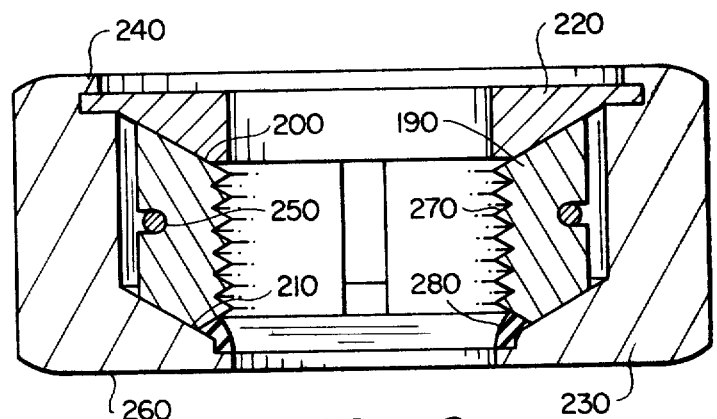
FIG_6
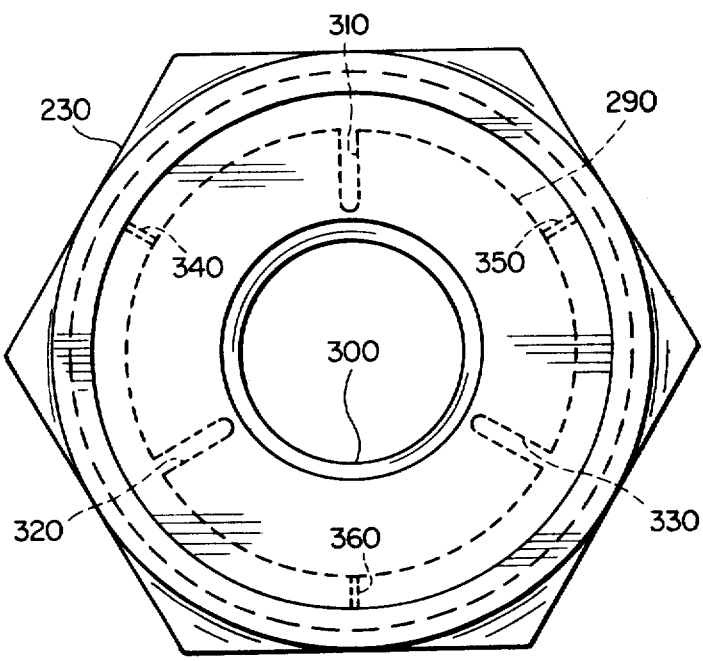
FIG_7

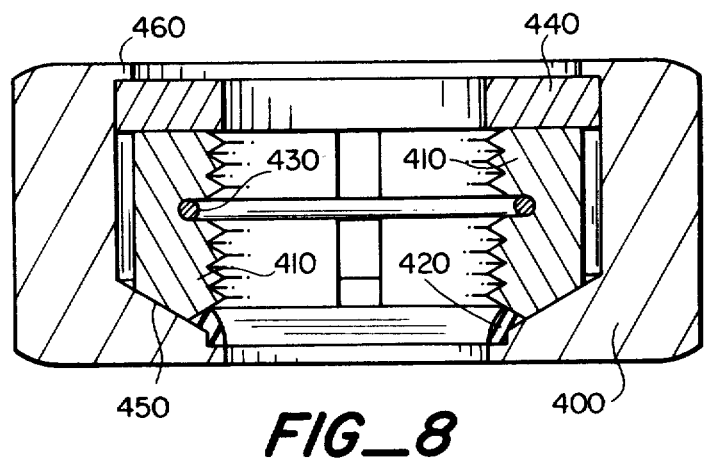
FIG_8
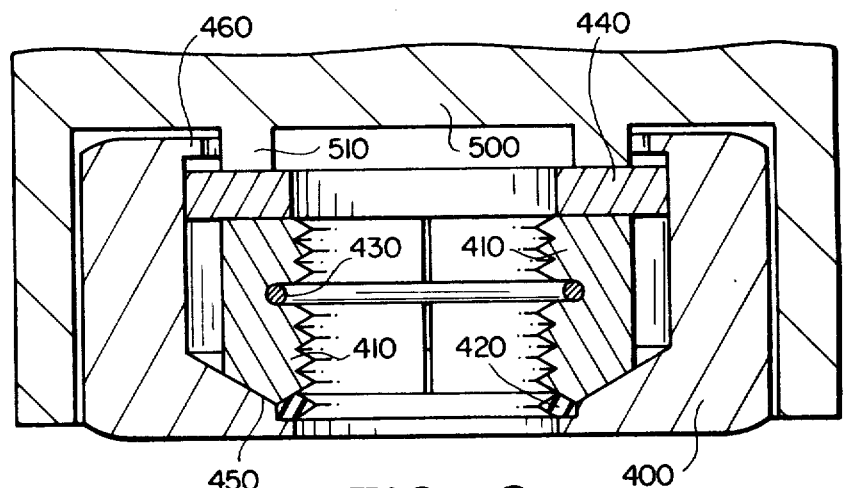
FIG_9
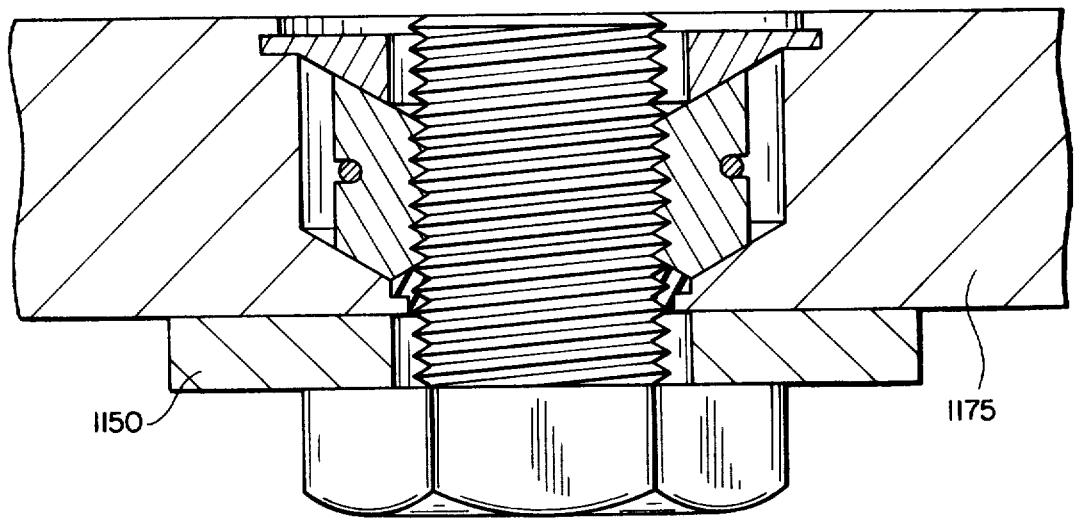
FIG_11

QUICK-ACTING NUT ASSEMBLY

BACKGROUND OF THE INVENTION

1. Field of the Invention

The present invention relates to threaded nut and bolt type fastening devices. Particularly, the present invention relates to threaded nuts adapted for selectively engaging a threaded bolt inserted therethrough.

2. Description of the Prior Art

Conventional nuts and bolts have the disadvantage of requiring a great many revolutions of the nut before the nut is brought into a locked position on the bolt. This is a result of rotational movement being required for both the positioning and the locking of the nut on the bolt. For example, using a wrench to bring a ½" nut into position on a 3" bolt takes several seconds. Further, when a conventional nut is finally tightened into a locked position, only a few of the threads of the nut actually are in locking contact with the threaded bolt. Particularly, threads on conventional nuts are intentionally made asymmetrical to help avoid cross-threading. This results in only 2 or 3 revolutions of the thread tightly engaging the bolt. These threads distort, providing a locking characteristic as the nut is tightened upon the bolts; however, the remaining threads are largely ineffective and do not significantly contribute to either the locking action or the holding power of the nut.

SUMMARY OF THE INVENTION

In accordance with the illustrated preferred embodiments, the present invention provides apparatus for a threaded nut which can be quickly positioned on a threaded bolt through the application of translational force applied to position the nut along the bolt. Further, this nut is adapted to selectively engage the threaded bolt inserted therethrough. Particularly, a multi-part nut casing has an inclined interior surface adapted for sliding engagement with a threaded jam nut which wedges therein. As the jam nut moves in a first direction along the inclined surface, it compresses radially and the threads of the jam nut engage the threads of the bolt. As the jam nut moves in a second direction along the inclined surface, it may expand radially and disengage from the bolt. When the nut is in the engaged position, it may be tightened into a locking position by a conventional rotational motion. However, unlike conventional threaded nuts, the threaded surfaces of the present invention provide a uniform and steadily increasing normal force radially inward on the bolt as the nut is rotated.

BRIEF DESCRIPTION OF THE DRAWINGS

FIG. 1 is a cross-sectional perspective view of a threaded nut in accordance with the preferred embodiment of the present invention.

FIG. 2 is a cross-sectional view of a threaded nut in a non-locking position adapted for quick release having an expansion spring.

FIG. 3 is a cross-sectional view of the threaded nut of FIG. 2 in an engaged position.

FIG. 4 is a top view of the threaded nut of FIG. 3 showing the nut casing and jam nut halves.

FIG. 5 is a cross-sectional view of a threaded nut in a locking position adapted for quick locking having a compression spring.

FIG. 6 is a cross-sectional view of the threaded nut of FIG. 5 in a non-locking position.

FIG. 7 is a top view of the threaded nut of FIG. 6 illustrating splines and a deformable jam nut.

FIG. 8 is a cross-sectional view of a threaded nut in a non-locking position having an expansion spring and a movable cap.

FIG. 9 is a cross-sectional view of the threaded nut of FIG. 8 in a locking position.

FIG. 10 is a cross-sectional perspective view of the threaded nut of FIG. 5.

FIG. 11 is a cross-sectional view of a threaded nut in accordance with the present invention which is captively disposed within a base plate.

DETAILED DESCRIPTION OF THE PREFERRED EMBODIMENT

FIG. 1 is a cross-sectional perspective view of a threaded nut in accordance with the preferred embodiment of the present invention. A nut casing 10 has six (6) facets 20 as is conventional for threaded nuts. However, the interior surface of nut casing 10 is characterized by an inclined surface 30 having an angle in respect to the symmetrical axis of the nut substantially equal to the slope angle of the threads on the bolt to which the nut is to be mated. The thread surfaces of conventional bolts are typically inclined approximately 30° relative to the symmetrical axis of the bolt, therefore, in the preferred embodiment inclined surface 30 is angled substantially 30° relative to the symmetrical axis of the nut.

Jam nut halves 50 and 60 have outer surfaces inclined relative to the symmetrical axis at the same angle as the inclination of inclined surface 30 of the nut casing 10. Jam nut halves 50 and 60 are characterized by a threaded inner surface 70 adapted to receive the threads of a bolt. Jam nut halves 50 and 60 are separated by a gap 90 which varies in width as the jam nut halves move along the symmetrical axis relative to nut casing 10. Further, jam nut halves 50 and 60 and nut casing 10 are adapted to remain in alignment with one another. Specifically, the illustration shows a groove 100 in inclined surface 30 of nut casing 10 and a corresponding adaptation or spline in jam nut half 60 which permits the jam nut halves to move in a direction substantially along the symmetrical axis but limits the relative rotation about the symmetrical axis of the jam nut halves in respect to nut casing 10.

Further, nut casing 10 is characterized by a surface 40 adapted to be bonded to elastic stop washer 110. Since this bond also limits the relative rotation between the jam nut halves and the nut casing, the illustrated nut could be constructed without groove 100 and the corresponding adaptation of jam nut half 60.

FIG. 2 is a cross-sectional view of a threaded nut in a non-locking position adapted for quick release having an expansion spring. Specifically, in the non-locking position, threaded inner surface 70 of jam nut half 60 is not engaged with threaded surface 170 of a bolt 180 inserted in the illustrated jam nut. Jam nut halves 50 and 60 have a grooved adaptation 30, adapted to receive an expansion spring 140. This expansion spring 140 applies a force radially outward upon the jam nut halves biasing threaded inner surface 70 away from threaded surface 170 of bolt 180. Elastic stop washer 110 is bonded to nut casing 10 and to jam nut halves 50 and 60 and restricts the motion of the jam nut halves once a free position has been attained. Elastic stop washer 110 is constructed such that it will not contact the threads at surface 170 of bolt 180 in the free position.

In the free position, surface 160 of jam nut halves 50 and 60 is raised in respect to surface 150 of nut casing 10. Pressure upon surface 160 will counteract the outward force of the expansion spring 140 and cause inner threaded surface 30 of jam nut halves 50 and 60 to engage threaded surface 170 of bolt 180. FIG. 3 illustrates the jam nut in an engaged position. Specifically, jam nut halves 50 and 60 have moved along the symmetrical axis with surface 160 coming into a flush relationship with surface 150 of nut casing 10. As the jam nut halves have moved along the inclined surface 30 of nut casing 10, they have also decreased the radius of threaded inner surface 70 of jam nut halves 50 and 60 and have reduced the size of gap 90 therebetween. As the jam nut halves move along the symmetrical axis into the engaged position, they also compress elastic stop washer 110. This causes elastic stop washer 110 to engage the threads of threaded surface 170 of bolt 180 and cause a locking action. Once the pressure on surface 160 has resulted in engaged relationship between threaded inner surface 70 at the jam nut halves and threaded surface 170 of bolt 180, a wrench or a similar device can be used to rotate nut casing 10 relative to bolt 180. As nut casing 10 rotates, the groove 100 in the nut casing and the corresponding adaptation of the jam nut halves 50 and 60 will cause the jam nut halves to rotate also. Assuming that surface 120 of nut casing 10 now meets the resistance, further rotation of nut casing 10 will cause jam nut halves 50 and 60 to move towards surface 120 along the inclined surface 30, further tightening the grip of threaded inner surfaces 70 upon bolt 180. The compression of elastic stop washer 110 into the threads of bolt 180 will ensure that the nut will remain locked in the tightened position once the wrench is removed.

FIG. 4 is a top view of the threaded nut of FIG. 3 showing surfaces 150 and 160 of nut casing 10 and jam nut halves 50 and 60 respectively.

FIG. 5 is a cross-sectional view of a second preferred embodiment of a jam nut in accordance with the present invention. In this embodiment, jam nut halves 190 have inclined surfaces 200 and 210 which engage inclined surfaces on a cap 220 and on a nut casing 230 respectively. Cap 220 restricts the motion of jam nut halves 190 so that the jam nut halves are inescapably positioned within nut casing 230 and cap 220. In this embodiment, nut casing 230 has an edge 240 which is rolled, pressure bent, or press fit over the cap 220 to lock the cap into a fixed position.

A compression spring 250 is positioned with an adaptation of the jam nut halves, compression spring 250 biases jam nut halves towards the symmetrical axis into a position engaging threads 270 of jam nut halves 190 with the threads of the bolt. As the bolt is inserted in the direction indicated by the arrow, jam nut halves 170 are pushed outwardly disengaging threads 270 of the jam nut halves from the threads of the bolt. This enables the nut to be quickly pushed to a desired position on the threaded bolt. As the nut is pushed along the threaded surfaces of the bolt, the jam nut halves ratchet as the inner threaded surface moves relative to the bolt and compression string 250 attempts to hold the threads against the threaded surface of the bolt. When surface 260 of nut casing 230 meets resistance, threaded surface 270 of jam nut halves 190 engage the threaded surface of the bolt. By rotating the nut casing 230, jam nut halves 190 are pulled towards surface 260 of nut casing 230 and along inclined surface 210 tightening threaded inner surface 270 of jam nut halves 190 against the threads of the bolt. Rubber elastic stop washer 280 deforms into the threaded surface of the bolt locking the jam nut into position.

As in the first embodiment, inclined surfaces of the jam nut halves 190 and the inclined surfaces of the nut casing 230 and cap 220 are inclined at an angle relative to the symmetrical axis of the nut and the bolt at the same angle as the threads on the jam nut halves and the bolt. It has been determined that substantially different angles cause the threads to jam and do not allow an easy ratcheting motion for moving the nut into position on the threaded bolt. Therefore, these embodiments illustrate jam nuts having a quick-on and locking characteristic which are removed in a manner of a conventional nut, that is, being rotated the entire distance of the threaded surfaces.

FIG. 6 illustrates the position of jam nut halves 190 as the bolt is inserted pushing the jam nut halves 190 further apart. Note that threaded inner surfaces 270 of jam nut halves 190 do not protrude any further than the inner surfaces of cap 220 and nut casing 230. A perspective sectional view of the embodiment of FIGS. 5 and 6 is shown in FIG. 10. In this perspective view, jam nut segment 190a is shown in the normal position for this embodiment when the bolt and nut are disengaged while jam nut half 190b is shown in the position the segments are in when the bolt is in place. The segments are, of course, normally in the same position, either in or out, and are only shown in different positions for illustration purposes.

It has been determined that instead of using two jam nut halves 50 and 60 as in FIG. 1, or 190 as in FIGS. 5 and 6, any number of jam nut segments can be used. Three segments is preferred. However, in another embodiment, the jam nut section is made of one deformable plastic part. Referring to FIG. 7, a top view of FIG. 5, a jam nut 290 is illustrated having a continuous threaded inner surface 300 and replaces jam nut halves 190. As illustrated, notches 310, 320, and 330 act in the same manner as gap 90 in FIG. 1. As the jam nut is compressed and tightens upon the bolt, the inner and outer radiuses of the jam nut decrease, causing the notches 310, 320 and 330 to decrease in size. However, since the jam nut is made of a deformable plastic material, and since the reduction of the radii is small, continuous threaded inner surface 300 can deform sufficiently to permit the required reduction in radius. It is expected that many different types of plastic can be used in this embodiment and that the deformation of the plastic will result in the desired locking action of the nut.

FIG. 7 also illustrates splines 340, 350 and 360 which correspond to splines on the inclined surface 210 of nut casing 230 of FIG. 5. Inclined surface 210 and jam nut 290 which replaces the jam nut halves 190 of FIG. 5 has notches on its underside adapted to engage the splines illustrated. In the preferred embodiment, the splines or notches are in the form of serrations along the inclined surfaces of the jam nut and the nut casing. As would be obvious to a person skilled in the art, these splines and notches can also be formed on the upper surface 200 of jam nut 290 and the inclined surfaces of cap 220. Finally, in the embodiments having elastic stop washers, the glue bond between the nut casing, the elastic stop washer and the jam nut may be sufficient to restrict rotation of the jam nut segments relative to the nut casing. Therefore, to a person skilled in the art, there are many equivalent means for restricting the rotation on the jam nut relative to the nut casing which are within the scope of the present invention.

FIGS. 8 and 9 are cross-section views of another preferred embodiment of the present invention. Particularly, referring to FIG. 8, a jam nut has a nut casing 400, jam nut segments 410, an elastic stop washer 420 and an expansion spring 430 mounted within an adaptation of the jam nut segments 410. The jam nut further comprises a cap 440 which is movably mounted relative to the nut casing 400. In FIG. 8 expansion spring 430 has expanded jam nut segments 410 moving them radially outward and towards the top of the jam nut along inclined surface 450. As the jam nut segments move towards the top of the nut casing, cap 440 is moved towards the top of the nut casing, cap 440 is moved towards the top of the nut casing also. As shown in the illustration, an adaptation 460 of nut casing 400 inescapably mounts and inescapably secures cap 440 within the nut casing 400.

FIG. 9 illustrates a socket 500 adapted to cooperate with the jam nut of FIG. 8. Socket 500 has extensions 510 adapted for engaging cap 440. In operation, the jam nut illustrated in FIGS. 8 and 9 is quickly positioned on a threaded bolt, with the threads on the jam nut segments biased free from engagement with the threads of the bolt. Once surface 520 meets resistance, socket 500 presses against the jam nut and applies pressure against cap 440 which in turn presses jam nut segments 410 against inclined surface 450. Pressure of jam nut segments 410 against inclined surface 450 will cause the jam nut segments to move radially inward causing the threads of jam nut segments 410 to engage with threads of the bolt inserted within the jam nut. Once the threads of the jam nut are engaged, rotation of the nut casing 400 will cause jam nut segments to tighten further, pulling the jam nut segments towards the surface 520 of nut casing 400 and locking the nut in a position on the threaded bolt as elastic stop washer 420 deforms in the threads of the bolt. To remove the nut from the bolt, a conventional socket is used to turn the nut casing in the opposite direction. As the pressure between surface 520 and the jam nut halves 410 is reduced, and since there is no pressure from cap 440 upon jam nut halves 410, the expansion spring 430 will cause jam nut halves 410 to move along inclined surface 450 in a direction away from the surface 520 freeing the threads of the jam nut segments from the threaded bolt. Thus, this preferred embodiment of the present invention provides a jam nut which freely slips on and off of a threaded bolt without rotation and also provides for a locking of the nut on the bolt in a conventional manner. Thus, the speed with which a nut can be placed on and off of a threaded bolt is substantially reduced.

In addition to proving the time required to place the described nuts on and/or off of a threaded bolt, the present design is characterized by an even pressure of all the threads of the jam nut segments, upon the threaded bolt surfaces. This is a significant improvement over conventional nuts wherein only 1 or 2 thread revolutions of a nut engage the threaded bolt. Particularly, in the present invention, the pressure between the threads, the jam nut segments, and the threaded bolt increases in a radial direction without deformation of the threads of the jam nut segments as the nut is tightened upon the threaded bolt and is evenly distributed across all of the threads.

It should be noted that although the present invention is described with respect to a speed nut, it is readily adaptable to other applications. For example, the jam nut segments could be placed in a base plate as shown in FIG. 11. In the illustrated embodiment of FIG. 11, a plate 1150 is attached to a base plate 1175 which contains jam nut segments as discussed above. This provides the advantage of the speed nut of the present invention plus the advantages of a captive fastener or threaded opening.

I claim:

1. A threaded nut assembly for selectively engaging a threaded member comprising:
   a nut casing having an opening therethrough and having an interior cavity defined by interior surfaces at least two of which are inclined at a first angle relative to the vertical axis of the opening passing through the nut casing; and
   jam nut means having a formation for residing within said interior cavity and having outer surfaces inclined at the first angle with respect to the vertical axis of the jam nut means and adapted for sliding engagement with the interior surfaces of said nut casing, said jam nut means having an inner threaded surface with a radius which varies as a function of the relative position of the nut casing and said jam nut means, the threads of the inner threaded surface of said jam nut means have a slope angle relative to the symmetrical axis of the jam nut means substantially equal to the first angle.

2. The threaded nut as in claim 1 wherein said nut casing comprises a cap means for providing an end portion of said nut casing and for defining said interior cavity and having a surface adapted for sliding engagement with one of the outer surfaces of said jam nut means for guiding the movement of said jam nut means.

3. The threaded nut assembly as in claim 1 wherein said jam nut means comprises compression means for biasing said jam nut means radially inward and into engagement with a threaded member inserted therethrough.

4. The threaded nut assembly as in claim 3 wherein said nut casing and said jam nut means are adapted for limiting the rotational movement therebetween.

5. The threaded nut as in claim 4 wherein said first angle is thirty degrees.

6. A threaded nut for selectively engaging a threaded member comprising:
   multi-faceted nut casing having an interior surface inclined at a first angle relative to the symmetrical axis of the nut casing;
   jam nut means having an outer surface inclined at the first angle with respect to the symmetrical axis of the jam nut means and adapted for sliding engagement with the interior surface of said nut casing, said jam nut means having an inner threaded surface with a radius which varies as a function of the relative position of the nut casing and said jam nut means; and
   an elastic stop washer bonded to said nut casing and to said jam nut means along the narrow end of the jam nut means such that the elastic stop washer is biased into engagement with a threaded member as the jam nut means moves towards the elastic stop washer along the inside surface of said nut means.

7. A threaded nut for selectively engaging a threaded member as in claim 6 wherein said jam nut means further comprises a second inclined surface substantially parallel to inclined outer surface and said threaded nut further comprises a cap means having a surface adapted for sliding engagement with the second inclined surface for limiting the movement of a jam nut means.

8. A threaded nut for selectively engaging a threaded member as in claim 7 wherein said jam nut is further comprised of a first surface substantially perpendicular to the symmetrical axis thereof and substantially opposite to the inclined outer surface, said threaded nut further comprising cap means having a surface adapted for engagement with the first surface, said cap means movably mounted relative to said nut casing for movement along the symmetrical axis.

9. A threaded nut for selectively engaging a threaded member comprising:
   multi-faceted nut casing having an interior surface inclined at a first angle relative to the symmetrical axis of the nut casing;
   jam nut means having an outer surface inclined at the first angle with respect to the symmetrical axis of the jam nut means and adapted for sliding engagement with the interior surface of said nut casing, said jam nut means having an inner threaded surface with a radius which varies as a function of the relative position of the nut casing and said jam nut means; said jam nut having a first surface substantially perpendicular to the symmetrical axis thereof and substantially opposite to the inclined outer surface, said threaded nut further comprising cap means having a surface adapted for engagement with the first surface, said cap means movably mounted relative to said nut casing for movement along the symmetrical axis; and wherein the threads of the inner threaded surface of said jam nut means have a slope angle relative to the symmetrical axis of the jam nut means substantially equal to the first angle.

10. A threaded nut for selectively engaging a threaded member as in claim 9 wherein the first angle is substantially equal to 30°.

* * * * *